(12) United States Patent
Sun et al.

(10) Patent No.: US 11,769,063 B2
(45) Date of Patent: Sep. 26, 2023

(54) PROVIDING PREDICTIVE ANALYTICS WITH PREDICTIONS TAILORED FOR A SPECIFIC DOMAIN

(71) Applicant: International Business Machines Corporation, Armonk, NY (US)

(72) Inventors: Changying Sun, Ottawa (CA); Lin Luo, Carp (CA); Graham Wills, Naperville, IL (US); Mohammed Mostafa, Kanata (CA)

(73) Assignee: International Business Machines Corporation, Armonk, NY (US)

(*) Notice: Subject to any disclaimer, the term of this patent is extended or adjusted under 35 U.S.C. 154(b) by 909 days.

(21) Appl. No.: 16/658,812

(22) Filed: Oct. 21, 2019

(65) Prior Publication Data
US 2021/0117811 A1    Apr. 22, 2021

(51) Int. Cl.
*G06N 5/02* (2023.01)
*G06N 5/022* (2023.01)
(Continued)

(52) U.S. Cl.
CPC ......... *G06N 5/022* (2013.01); *G06F 18/2113* (2023.01); *G06F 18/22* (2023.01); *G06N 7/00* (2013.01); *G06V 30/274* (2022.01)

(58) Field of Classification Search
CPC .......... G06N 5/022; G06N 7/00; G06N 20/00; G06K 9/6215; G06K 9/623; G06V 30/274; G06F 40/237; G06F 40/30
See application file for complete search history.

(56) References Cited

U.S. PATENT DOCUMENTS 10,191,966 B2   1/2019   Pallath et al.
10,229,169 B2   3/2019   He et al.
(Continued)

OTHER PUBLICATIONS

Wang et al., "Domain Ontology Guided Feature-Selection for Document Categorization," https://pdfs.semanticscholar.org/b867/155b05451794c1afcc0d4f240e8fc995ab55.pdf, 2001, pp. 1-10.
(Continued)

*Primary Examiner* — Zhitong Chen
(74) *Attorney, Agent, or Firm* — SHACKELFORD, BOWEN, MCKINLEY & NORTON, LLP; Robert A. Voigt, Jr.

(57) ABSTRACT

A computer-implemented method, system and computer program product for providing predictions tailored for a specific domain. Each field within a set of datasets is classified with a concept defined in a domain specific ontology. After receiving a target field and identifying a target concept tagged to the target field, concepts that have an influential impact directly to the target concept or indirectly to a concept tagged to a field associated with the target field are identified. Fields are then identified as candidates for predictors from the identified concepts using a semantic relationship and a numeric association combined approach. An influential confidence score and a numeric analytics score are then calculated for each of these candidates upon which a final confidence score is computed. The identified candidates are ranked based on the final confidence scores, and the top ranked candidates for predictors are selected to build a statistical model.

20 Claims, 6 Drawing Sheets

(51) Int. Cl.
  *G06N 7/00*     (2023.01)
  *G06V 30/262*   (2022.01)
  *G06F 18/22*    (2023.01)
  *G06F 18/2113*  (2023.01)

(56) References Cited

U.S. PATENT DOCUMENTS

| | | |
|---|---|---|
| 2014/0207765 A1 | 7/2014 | Haws et al. |
| 2014/0344208 A1 | 11/2014 | Ghasemzadeh et al. |
| 2016/0071120 A1* | 3/2016 | Fleischman ........ G06Q 30/0245 |
| | | 705/7.29 |
| 2017/0103402 A1* | 4/2017 | El-Diraby .............. G06N 20/00 |
| 2017/0364590 A1 | 12/2017 | Hill et al. |
| 2019/0220695 A1* | 7/2019 | Nefedov ................ G06N 5/022 |

OTHER PUBLICATIONS

Yordan Terziev, "Feature Generation Using Ontologies During Induction of Decision Trees on Linked Data," http://ceur-ws.org/Vol-1733/paper-12.pdf, 2016, pp. 1-9.

* cited by examiner

Table 301:
- 304 REPAIR DATE
- 305 VEHICLE VIN CODE
- 306 PART REPLACED
- 307 PARTS QTY
- 308 DISCOUNT
- 309 AMOUNT
- 310 STORE ID
- 311 TECHNICIAN ID
- 312 LABOR HOURS
- 313 COMMENTS Table 302:
- 314 VIN CODE
- 315 MAKE
- 316 MODEL
- 317 YEAR MADE
- 318 OWNER
- 319 HOME ADDRESS
- 320 CITY
- 321 PROVINCE Table 303:
- 322 EMPLOYEE ID
- 323 FULL NAME
- 324 SEX
- 325 DATE OF BIRTH
- 326 JOB TITLE
- 327 SALARY
- 328 MANAGER
- 329 DEPARTMENT

PROVIDING PREDICTIVE ANALYTICS WITH PREDICTIONS TAILORED FOR A SPECIFIC DOMAIN

TECHNICAL FIELD

The present invention relates generally to predictive analytics, and more particularly to providing predictive analytics at interactive speed with meaningful predictions tailored for a specific domain (e.g., specific business domain).

BACKGROUND

Predictive analytics encompasses a variety of statistical techniques from data mining, predictive modelling, and machine learning, that analyze current and historical facts to make predictions about future or otherwise unknown events. In business, predictive models exploit patterns found in historical and transactional data to identify risks and opportunities. Models capture relationships among many factors to allow assessment of risk or potential associated with a particular set of conditions, guiding decision-making for candidate transactions.

SUMMARY

In one embodiment of the present invention, a computer-implemented method for providing predictions tailored for a specific domain comprises receiving a set of datasets. The method further comprises classifying each field within the set of datasets with a concept defined in a domain specific ontology. The method additionally comprises receiving a target field. Furthermore, the method comprises identifying a target concept tagged to the target field. Additionally, the method comprises identifying concepts that have an influential impact directly to the target concept or indirectly to a concept tagged to a field associated with the target field. In addition, the method comprises identifying fields as candidates for predictors from the identified concepts using a semantic relationship and a numeric association combined approach. The method further comprises calculating influential confidence scores for each of the identified candidates for predictors. The method additionally comprises evaluating numeric metadata information for each of the identified candidates for predictors. Furthermore, the method comprises computing a numeric analytics score for each of the identified candidates for predictors based on the evaluated numeric metadata information. Additionally, the method comprises computing a final confidence score for each of the identified candidates for predictors using the influential confidence scores and the numeric analytics scores. In addition, the method comprises ranking the identified candidates for predictors based on the final confidence scores. The method further comprises selecting a portion of the candidates for predictors to build a statistical model based on the ranking.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

As stated in the Background section, predictive analytics encompasses a variety of statistical techniques from data mining, predictive modelling, and machine learning, that analyze current and historical facts to make predictions about future or otherwise unknown events. In business, predictive models exploit patterns found in historical and transactional data to identify risks and opportunities. Models capture relationships among many factors to allow assessment of risk or potential associated with a particular set of conditions, guiding decision-making for candidate transactions. The defining functional effect of these technical approaches is that predictive analytics provides a predictive score (probability) for each individual (customer, employee, healthcare patient, product SKU, vehicle, component, machine, or other organizational unit) in order to determine, inform, or influence organizational processes that pertain across large numbers of individuals, such as in marketing, credit risk assessment, fraud detection, manufacturing, healthcare, and government operations including law enforcement. In the realm of enterprise business analytics, users may have to analyze a vast amount of data spread across many datasets. It is a common need for the user to explore their data and select different outcome variables (targets) and identify which feature(s) have the most impact in the selected outcome variable (selected target). Many existing statistical techniques face challenges when dealing with a large number of features since building a statistical model with a large number of features can be slow or not applicable in some cases. Also, retrieving many features can be slow or expensive, especially retrieving features from pay-to-access data silos or joining many tables. Furthermore, many features limit the potential statistical and machine learning algorithms that can be employed. Additionally, using statistical analysis, it is currently only possible to establish a numerical association between the features and the outcome variable (target) and not on soft knowledge (e.g., common knowledge, common sense). As a result of such a limitation, the statistical model may generate a nonsensical prediction, such as "worldwide gross drive domestic gross." Hence, there is not currently a means for providing predictive analytics at interactive speed with meaningful predictions tailored for a specific domain (e.g., business domain).

The embodiments of the present invention provide a means for providing predictive analytics at interactive speed with meaningful predictions tailored for a specific domain (e.g., business domain) as discussed further below.

The present invention comprises a computer-implemented method, system and computer program product for providing predictions tailored for a specific domain. In one embodiment of the present invention, each field within a set of datasets is classified with a concept defined in a domain specific ontology. After receiving a target field and identifying a target concept tagged to the target field, concepts that have an influential impact directly to the target concept or indirectly to a concept tagged to a field associated with the target field are identified. Fields are then identified as candidates for predictors from the identified concepts using a semantic relationship and a numeric association combined approach. "Candidates for predictors," as used herein, refers to fields that have been selected as being potential predictors used for building a statistical model to provide predictions tailored for a specific domain involving the target field. Influential confidence scores are then calculated for each of these identified candidates. Metadata information is then evaluated for each of the identified candidates. A numeric analytics score is then computed for each of the identified candidates based on the evaluated metadata information. After computing the numeric analytics score, a final confidence score is computed for each of the identified candidates using the influential confidence scores and the numeric analytics scores. The identified candidates are then ranked based on the final confidence scores. Based on the ranking, the top candidates are selected to build a statistical model. In this manner, predictive analytics is provided at interactive speed with meaningful predictions tailored for a specific domain (e.g., business domain).

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
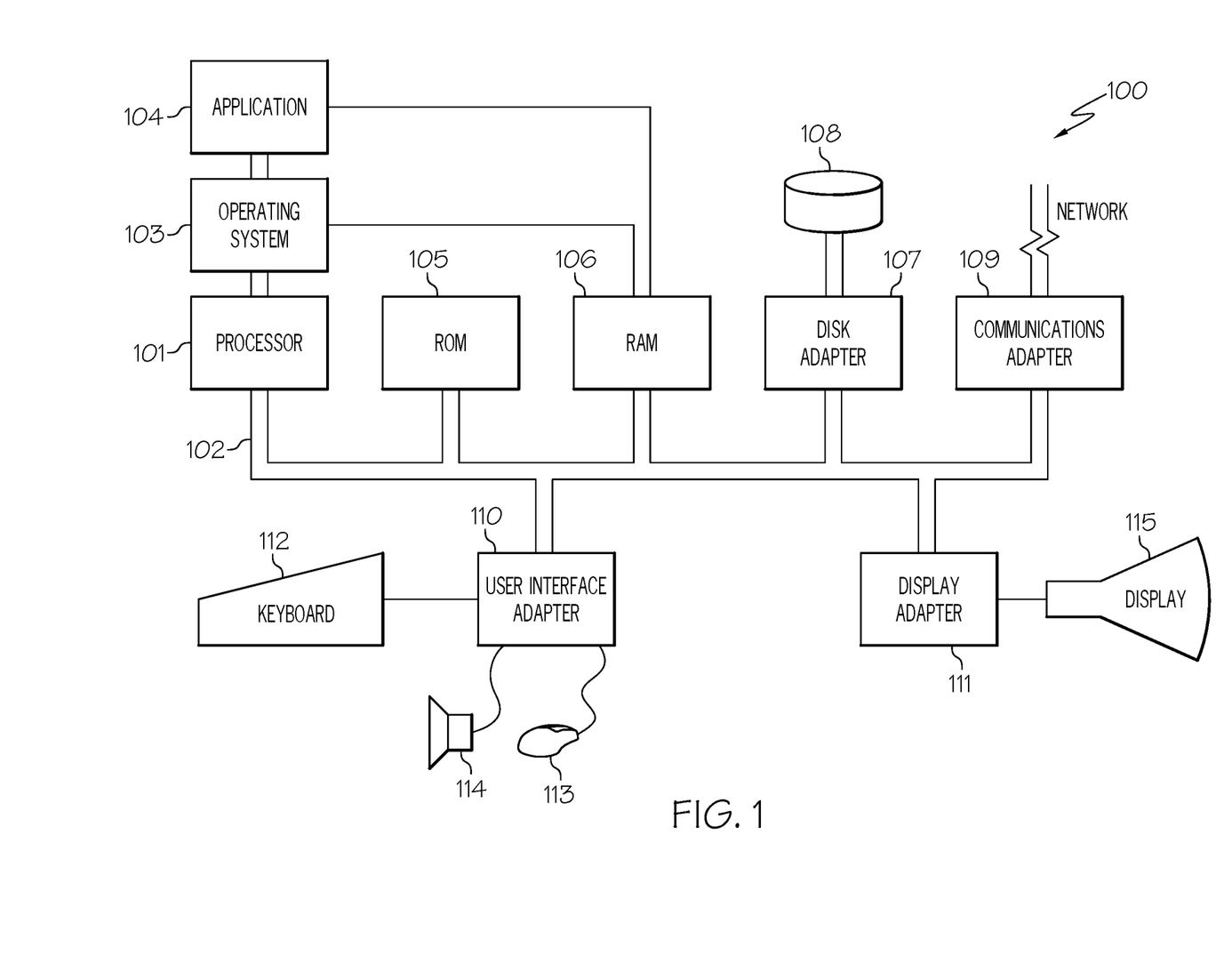
FIG. 1 illustrates an embodiment of the present invention of a hardware configuration of an analytics system which is representative of a hardware environment for practicing the present invention.

Referring now to the Figures in detail, FIG. 1 illustrates an embodiment of the present invention of the hardware configuration of an analytics system 100 which is representative of a hardware environment for practicing the present invention. Analytics system 100 may be any type of analytics system (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of providing predictive analytics at interactive speed with meaningful predictions tailored for a specific domain.

Referring to FIG. 1, analytics system 100 may have a processor 101 connected to various other components by system bus 102. An operating system 103 may run on processor 101 and provide control and coordinate the functions of the various components of FIG. 1. An application 104 in accordance with the principles of the present invention may run in conjunction with operating system 103 and provide calls to operating system 103 where the calls implement the various functions or services to be performed by application 104. Application 104 may include, for example, a program for providing predictive analytics at interactive speed with meaningful predictions tailored for a specific domain as discussed below in connection with FIGS. 2-6.

Referring again to FIG. 1, read-only memory ("ROM") 105 may be connected to system bus 102 and include a basic input/output system ("BIOS") that controls certain basic functions of analytics system 100. Random access memory ("RAM") 106 and disk adapter 107 may also be connected to system bus 102. It should be noted that software components including operating system 103 and application 104 may be loaded into RAM 106, which may be analytics system's 100 main memory for execution. Disk adapter 107 may be an integrated drive electronics ("IDE") adapter that communicates with a disk unit 108, e.g., disk drive. It is noted that the program for providing predictive analytics at interactive speed with meaningful predictions tailored for a specific domain, as discussed below in connection with FIGS. 2-6, may reside in disk unit 108 or in application 104.

Analytics system 100 may further include a communications adapter 109 connected to bus 102. Communications adapter 109 may interconnect bus 102 with an outside network thereby allowing analytics system 100 to communicate with other devices.

I/O devices may also be connected to analytics system 100 via a user interface adapter 110 and a display adapter 111. Keyboard 112, mouse 113 and speaker 114 may all be interconnected to bus 102 through user interface adapter 110. A display monitor 115 may be connected to system bus 102 by display adapter 111. In this manner, a user is capable of inputting to analytics system 100 through keyboard 112 or mouse 113 and receiving output from analytics system 100 via display 115 or speaker 114. Other input mechanisms may be used to input data to analytics system 100 that are not shown in FIG. 1, such as display 115 having touch-screen capability and keyboard 112 being a virtual keyboard. Analytics system 100 of FIG. 1 is not to be limited in scope to the elements depicted in FIG. 1 and may include fewer or additional elements than depicted in FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, predictive analytics encompasses a variety of statistical techniques from data mining, predictive modelling, and machine learning, that analyze current and historical facts to make predictions about future or otherwise unknown events. In business, predictive models exploit patterns found in historical and transactional data to identify risks and opportunities. Models capture relationships among many factors to allow assessment of risk or potential associated with a particular set of conditions, guiding decision-making for candidate transactions. The defining functional effect of these technical approaches is that predictive analytics provides a predictive score (probability) for each individual (customer, employee, healthcare patient, product SKU, vehicle, component, machine, or other organizational unit) in order to determine, inform, or influence organizational processes that pertain across large numbers of individuals, such as in marketing, credit risk assessment, fraud detection, manufacturing, healthcare, and government operations including law enforcement. In the realm of enterprise business analytics, users may have to analyze a vast amount of data spread across many datasets. It is a common need for the user to explore their data and select different outcome variables (targets) and identify which feature(s) have the most impact in the selected outcome variable (selected target). Many existing statistical techniques face challenges when dealing with a large number of features since building a statistical model with a large number of features can be slow or not applicable in some cases. Also, retrieving many features can be slow or expensive, especially retrieving features from pay-to-access data silos or joining many tables. Furthermore, many features limit the potential statistical and machine learning algorithms that can be employed. Additionally, using statistical analysis, it is currently only possible to establish a numerical association between the features and the outcome variable (target) and not on soft knowledge (e.g., common knowledge, common sense). As a result of such a limitation, the statistical model may generate a nonsensical prediction, such as "worldwide gross drive domestic gross." Hence, there is not currently a means for providing predictive analytics at interactive speed with meaningful predictions tailored for a specific domain (e.g., business domain).

Figure 2:
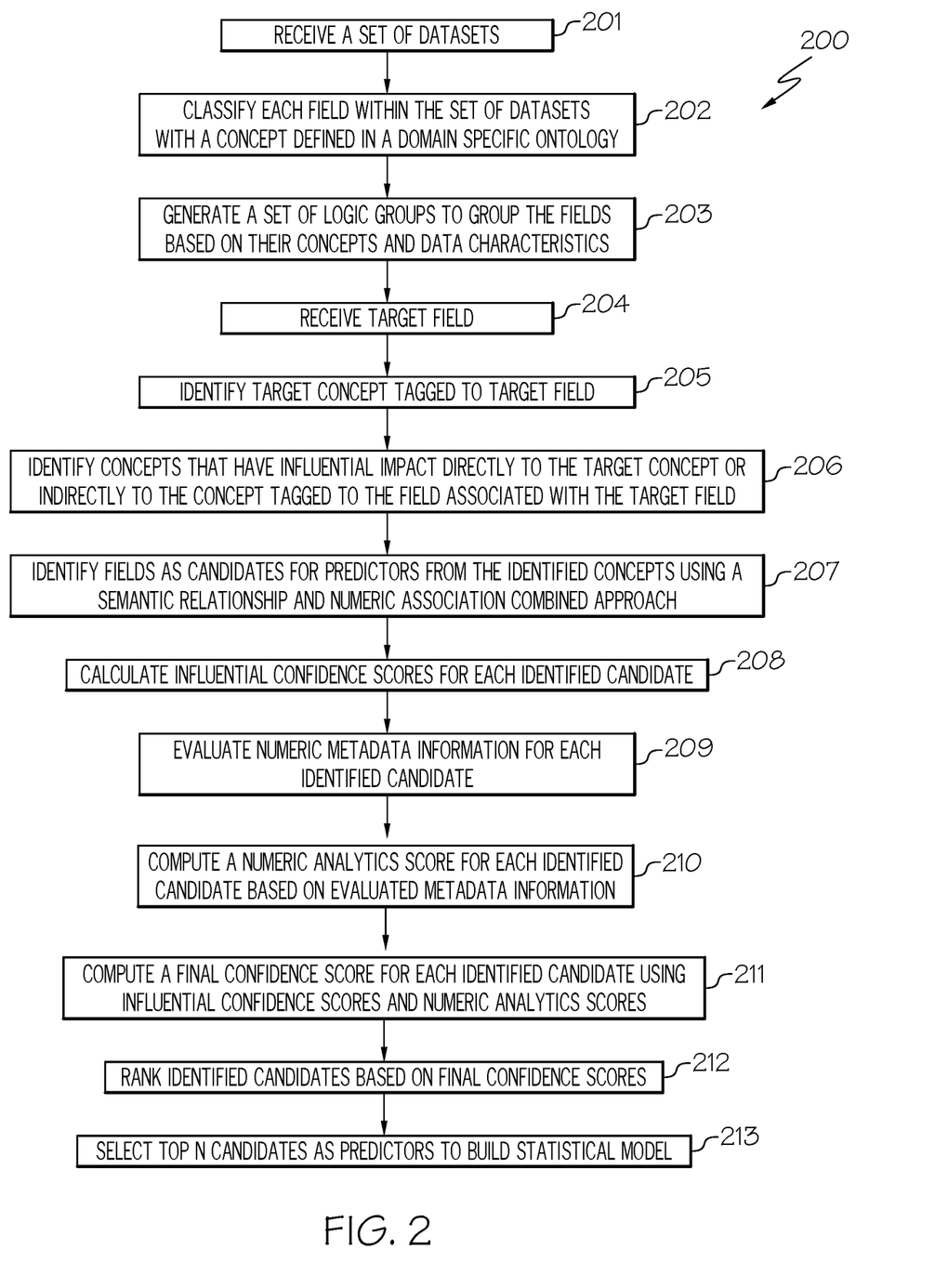
FIG. 2 is a flowchart of a method for providing predictions tailored for a specific domain in accordance with an embodiment of the present invention.
Figure 3:
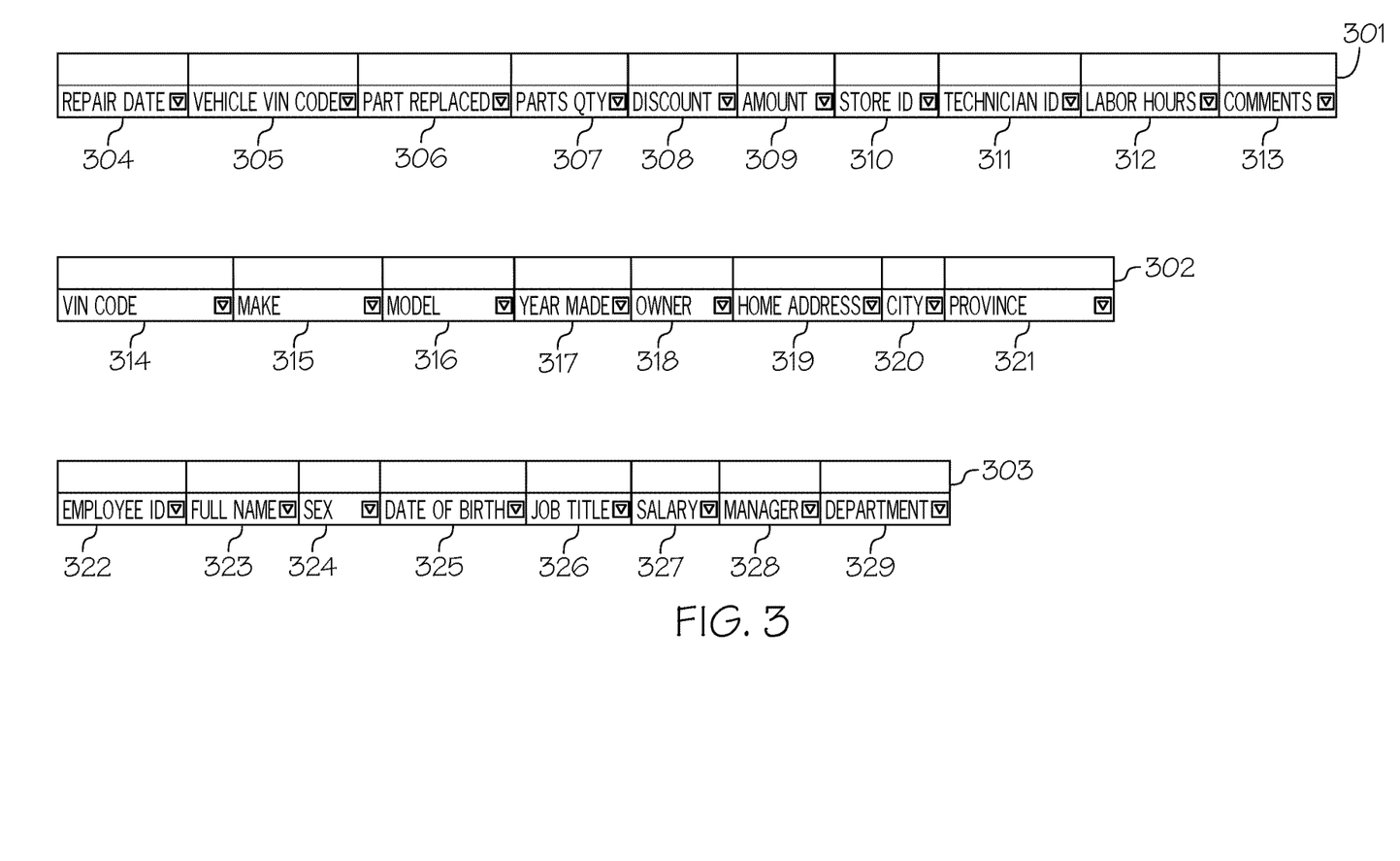
FIG. 3 illustrates the datasets to be analyzed for an auto repair shop in accordance with an embodiment of the present invention.
Figure 4:
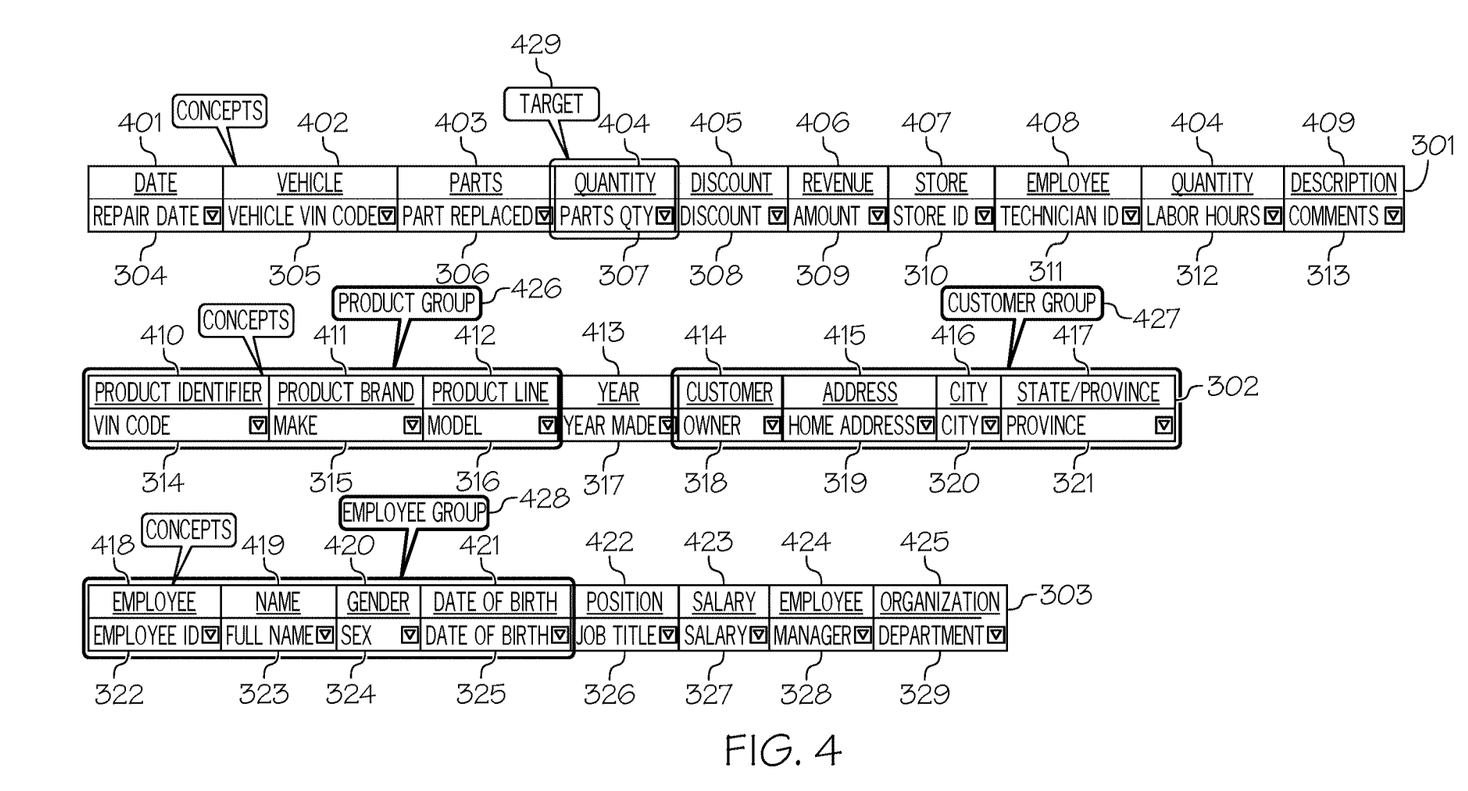
FIG. 4 illustrates the concept classification of the fields of the datasets for an auto repair shop in accordance with an embodiment of the present invention.
Figure 5:
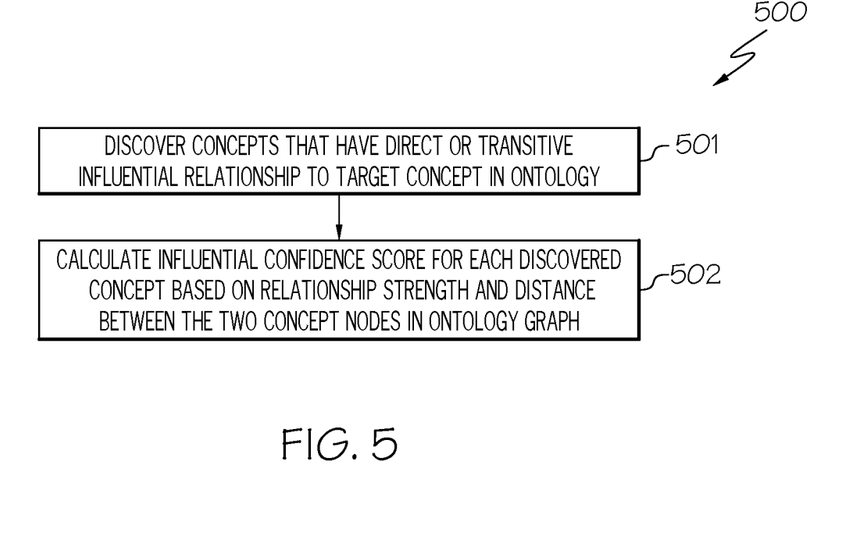
FIG. 5 is a flowchart of a method for identifying the concepts that have an influential impact directly to the target concept in accordance with an embodiment of the present invention.
Figure 6:
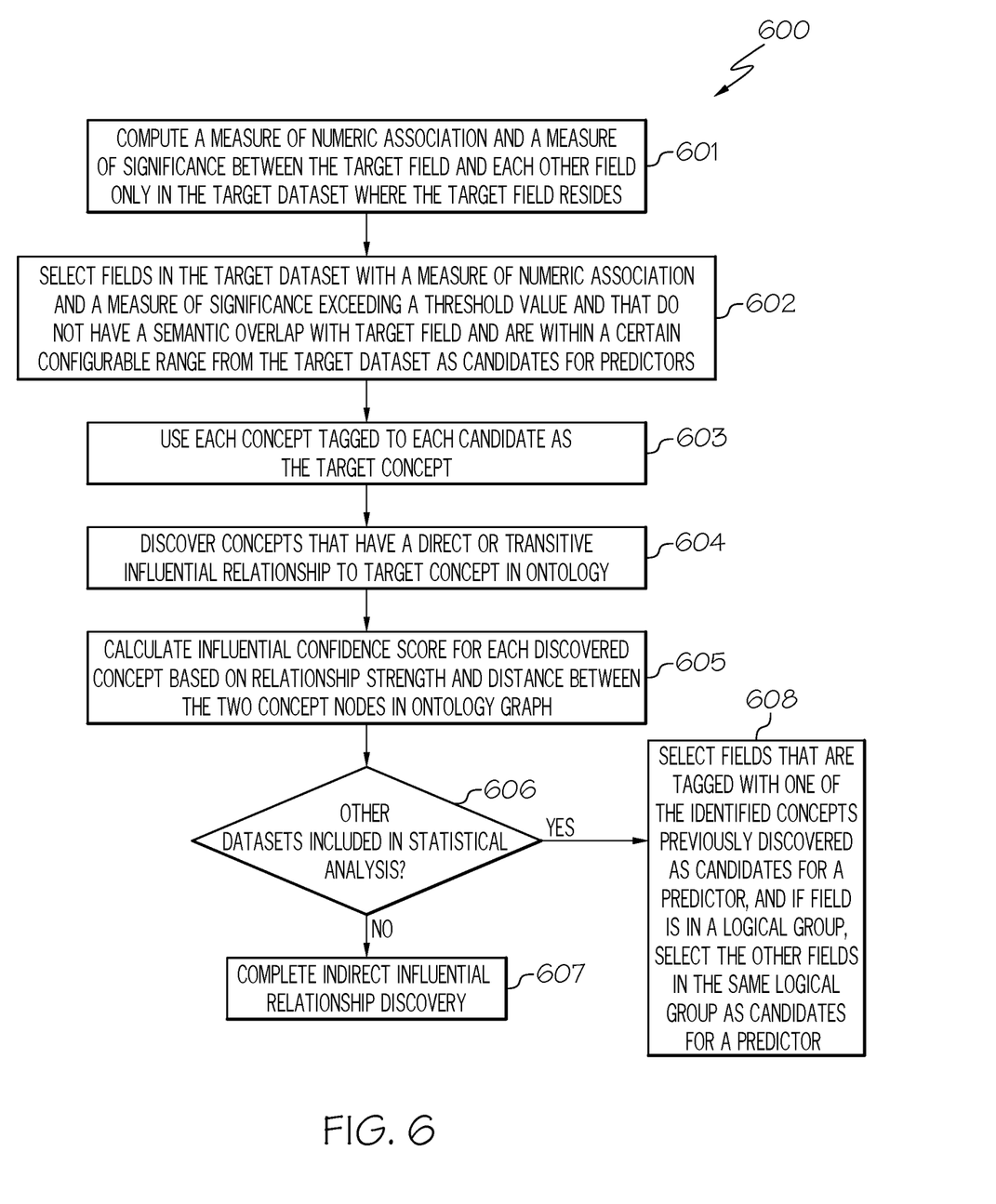
FIG. 6 is a flowchart of a method for identifying the concepts that have an influential impact indirectly to a concept tagged to a field associated with the target field in accordance with an embodiment of the present invention.

The embodiments of the present invention provide a means for providing predictive analytics at interactive speed with meaningful predictions tailored for a specific domain (e.g., business domain) as discussed below in connection with FIGS. 2-6. FIG. 2 is a flowchart of a method for providing predictions tailored for a specific domain. FIG. 3 illustrates the datasets to be analyzed for an auto repair shop. FIG. 4 illustrates the concept classification of the fields of the datasets for an auto repair shop. FIG. 5 is a flowchart of a method for identifying the concepts that have an influential impact directly to the target concept. FIG. 6 is a flowchart of a method for identifying the concepts that have an influential impact indirectly to a concept tagged to a field associated with the target field.

As stated above, FIG. 2 is a flowchart of method 200 for providing predictions tailored for a specific domain (e.g., specific business domain) in accordance with an embodiment of the present invention.

Referring to FIG. 2, in conjunction with FIG. 1, in step 201, analytics system 100 receives a set of datasets, such as datasets that are included in the statistical analysis. For instance, such datasets may be directed to an auto repair shop, which includes the datasets of vehicle parts repair details, vehicle owner details and employee details as shown in FIG. 3.

FIG. 3 illustrates the datasets to be analyzed for an auto repair shop in accordance with an embodiment of the present invention.

As shown in FIG. 3, such datasets include the dataset 301 directed to vehicle parts repair details (contains transactions of parts repair and replacement), vehicle owner details 302 (contains vehicle and the vehicle owner information) and employee details 303 (contains employee information). Furthermore, as shown in FIG. 3, the dataset involving vehicle parts repair details 301 includes the fields of repair date 304, vehicle VIN (vehicle identification number) code 305, parts replaced 306, parts quantity 307, discount 308, amount 309, store identifier (ID) 310, technician identifier (ID) 311, labor hours 312 and comments 313. Additionally, as shown in FIG. 3, the dataset 302 involving vehicle owner details includes the fields of VIN code 314, make of the vehicle 315, model of the vehicle 316, year the vehicle was made 317, owner of the vehicle 318, home address 319 of the owner of the vehicle, city 320 where the owner lives, and the province 321 where the owner lives. Furthermore, as shown in FIG. 3, the dataset 303 involving employee details includes the fields of employee identifier (ID) 322, the full name 323 of the employee, the sex 324 of the employee, the date of birth 325 of the employee, the job title 326 of the employee, the salary 327 of the employee, the manager 328 of the employee and the department 329 of the organization for which the employee is employed.

Returning to FIG. 2, in conjunction with FIGS. 1 and 3, in step 202, analytics system 100 classifies each field within the set of datasets with a concept defined in a domain specific ontology. An "ontology," as used herein, encompasses a representation, formal naming and definition of the categories, properties and relations between the concepts, data and entities that substantiate one, many or all domains of discourse. Ontologies represent the meanings of the concepts while they are giving relationships among them too. The associations among the concepts in an ontology are built through the semantic relations. Semantic relations appear in a number of ways including synonyms, homonyms, hypernyms/hyponyms, meronyms and associatives.

In one embodiment, the ontology is a data structure (e.g., graph) containing nodes, where each node represents a "concept." A "concept," as used herein, represents a set or class of entities or "things" within a domain. A "domain," as used herein, refers to a sphere of knowledge, such as knowledge pertaining to auto repair shops.

In one embodiment, analytics system 100 utilizes natural language processing to identify the concepts most semantically similar to the field names in the receive set of datasets. The field names are then classified with such identified concepts. "Semantic meaning," as used herein, refers to knowing what the word(s) or phrase(s) in the field names and concepts of the ontology actually means. "Semantically similar," as used herein, refers to having the degree that the meaning of the field name is the same as the meaning of a concept in the ontology exceed a threshold, which may be user-specified.

An example of classifying each field within the set of datasets with a concept defined in a domain specific ontology is provided in connection with FIG. 4.

FIG. 4 illustrates the concept classification of the fields of the datasets for an auto repair shop in accordance with an embodiment of the present invention.

Referring to FIG. 4, in conjunction with FIG. 3, the fields of repair date 304, vehicle VIN (vehicle identification number) code 305, parts replaced 306, parts quantity 307, discount 308, amount 309, store identifier (ID) 310, technician identifier (ID) 311, labor hours 312 and comments 313 in dataset 301 involving vehicle parts repair details are classified with the concepts of: date 401, vehicle 402, parts 403, quantity 404, discount 405, revenue 406, store 407, employee 408, quantity 404 and description 409, respectively. Furthermore, as shown in FIG. 4, the fields of VIN code 314, make of the vehicle 315, model of the vehicle 316, year the vehicle was made 317, owner of the vehicle 318, home address 319 of the owner of the vehicle, city 320 where the owner lives, and the province 321 where the owner lives involving dataset 302 of vehicle owner details are classified with the concepts of: product identifier 410, product brand 411, product line 412, year 413, customer 414, address 415, city 416 and state/province 417, respectively. Additionally, as shown in FIG. 4, the fields of employee identifier (ID) 322, the full name 323 of the employee, the sex 324 of the employee, the date of birth 325 of the employee, the job title 326 of the employee, the salary 327 of the employee, the manager 328 of the employee and the department 329 of the organization for which the employee is employed involving dataset 303 of employee details are classified with the concepts of: employee 418, name 419, gender 420, date of birth 431, position 422, salary 423, employee 424 and organization 425, respectively.

Returning to FIG. 2, in conjunction with FIGS. 1 and 3-4, in step 203, analytics system 100 generates a set of logic groups to group fields based on their concepts and data characteristics. For example, as shown in FIG. 4, analytics system 100 identifies a product group 426 which logically groups the fields of VIN code 314, make 315 and model 316 as well as a customer group 427 which logically groups the fields of owner 318, home address 319, city 320 and province 321 and an employee group 428 which logically groups the fields of employee ID 322, full name 323, sex 324, and date of birth 325.

In one embodiment, analytics system 100 logically groups fields based on their associated concepts and data characteristics (e.g., type of data). For example, the closer in semantic meaning the field names are to each other, the greater the likelihood that such fields should belong to the same logical group. In one embodiment, such semantic meaning may be determined by analytics system 100 using natural language processing. In another example, fields with similar data characteristics are more likely to belong to the same logical group than those fields with dissimilar data characteristics.

In one embodiment, analytics system 100 utilizes an ontology of logical groupings which contains nodes of logical groupings and sub-nodes containing the concepts associated with such logical groupings. Based on identifying the concepts in the ontology that are associated with the field names, analytics system 100 may identify a logical grouping that contains two or more of these concepts associated with the field names in the received set of datasets. For instance, the field names of VIN code 314, make 315 and model 316 of FIG. 4 are associated with the concepts of product identifier 410, product brand 411 and product line 412, respectively. In an ontology of logical groupings, such concepts (concepts 410, 411 and 412) may be sub-nodes to the node associated with the logical grouping of the "product group" 426. By identifying the concepts associated with these fields in the ontology, analytics system 100 may be able to identify a logical grouping.

In step 204, analytics system 100 receives a target field. A "target field," as used herein, refers to the field of the outcome variable (target) of the statistical model. In one embodiment, such a target field is selected by a user of analytics system 100, such as via a user interface. For example, a user of analytics system 100 may select one of the fields shown in FIG. 3 as corresponding to the target field, such as field 307 (parts quantity).

In step 205, analytics system 100 identifies a target concept tagged to the target field as shown in FIG. 4.

Referring to FIG. 4, the field of parts quantity 307 is identified as corresponding to the target 429, where the concept of quantity 404 corresponds to the target concept tagged to the target field of price quantity 307.

In step 206, analytics system 100 identifies the concepts that have an influential impact directly to the target concept or indirectly to a concept tagged to a field associated with the target field as discussed further below in connection with FIGS. 5 and 6.

In step 207, analytics system 100 identifies the fields as candidates for predictors from the identified concepts using a semantic relationship and numeric association combined approach as discussed further below in connection with FIGS. 5 and 6.

In step 208, analytics system 100 calculates the influential scores for each identified candidate as discussed further below in connection with FIGS. 5 and 6.

A discussion regarding identifying the concepts that have an influential impact directly to the target concept and identifying candidates for predictors is discussed below in connection with FIG. 5.

FIG. 5 is a flowchart of a method 500 for identifying the concepts that have an influential impact directly to the target concept in accordance with an embodiment of the present invention.

Referring to FIG. 5, in conjunction with FIGS. 1-4, in step 501, analytics system 100 discovers concepts that have a direct or transitive influential relationship to the target concept in the ontology. A "directive" or "transitive" influential relationship, as used herein, refers to being associated with one another, such as in ontology. For instance, referring to FIG. 4, the concepts of date 401, year 413 and vehicle 402 are identified as being influential concepts to the target concept of quantity 404 since they are the ancestors or the "subclass" to the target concept of quantity 404 in the ontology.

In one embodiment, in the concept discovery phase, concepts that have a direct or transitive influential relationship to the target concept are identified based on a core glossary which contains a target concept and a listing of concepts that are associated with the target concept. Such a glossary may be composed by a domain expert.

In one embodiment, synonyms of concepts identified as having a direct or transitive influential relationship to the target concept may be identified via clustering and the application of statistical similarity measures. Such identified synonyms may also be identified as concepts having a direct or transitive influential relationship to the target concept in the ontology.

In step 502, analytics system 100 calculates the influential confidence score for each discovered concept based on the relationship strength and the distance between the two concept nodes in the ontology graph (distance between the concept node associated with the non-target field and the concept node associated with the target concept in the ontology graph). In one embodiment, the relationship strength is based on the degree that the concepts in the ontology are associated with each other, which may be determined by employing a core glossary that contains the term and associated object descriptions. For example, the greater the association between the discovered concept to the target concept, the higher is the value of the "influential confidence score." The "influential confidence score," as used herein, is a metric for assessing the degree of influence that the concept has in affecting the value of the target field. In one embodiment, the higher the value of the influential confidence score, the greater the degree of influence that the concept has in affecting the value of the target field. "Influence," as used herein, refers to being able to affect the value of a field, such as the target field.

In one embodiment, the influential confidence score is not only based on the relationship strength between the concepts but also the distance between the two concept nodes in the ontology graph. In one embodiment, the distance between the concepts in the ontology graph represents the degree of influence that one concept has on the other concept and thereby the degree of influence that one concept has on the value of the field associated with the other concept. In one embodiment, the closer the distance, the greater the influential confidence score and vice-versa.

A discussion regarding identifying the concepts that have an influential impact indirectly to a concept tagged to a field associated with the target field is provided below in connection with FIG. 6.

Referring to FIG. 6, FIG. 6 is a flowchart of a method 600 for identifying the concepts that have an influential impact indirectly to a concept tagged to a field associated with the target field in accordance with an embodiment of the present invention.

Referring to FIG. 6, in conjunction with FIGS. 1-4, in step 601, analytics system 100 computes a measure of numeric association and a measure of significance between the target field and each other field only in the target dataset where the target field resides. In one embodiment, the measure of numeric association is performed by determining how semantically similar are the field names using natural language processing. The closer in semantic meaning the field names, the more semantically similar are the field names and a higher numeric association.

In one embodiment, the measure of significance between the fields (between the target field and another field in the target dataset) is performed by determining the amount of influence the field in the target dataset has in the resulting value of the target field. For example, the greater the value in the target field is dependent upon the value in the non-target field, the greater the significance between the fields. In one embodiment, such a determination is made based on an ontology graph containing nodes associated with the fields of a target dataset, where the distance between the nodes represents the degree of significance between the connecting nodes. In one embodiment, the closer the distance between the nodes, the greater the degree of significance between the connecting nodes. In one embodiment, such an ontology graph is generated based on machine learning models that are trained to determine the influence a field in a dataset has on the resulting value of another field in the dataset.

In step 602, analytics system 100 selects the fields in the target dataset with a measure of numeric association and a measure of significance exceeding a threshold value and that does not have a semantic overlap with the target field and are within a certain configurable range from the target dataset as candidates for predictors. In one embodiment, such a threshold value is user-selected.

"Candidates for predictors," as used herein, refers to fields that have been selected as being potential predictors used for building a statistical model to provide predictions tailored for a specific domain involving the target field.

"Semantic overlap," as used herein, refers to fields having different labels but are tagged with the same concept. Such fields are said to be semantically overlapped. For example, "income" and "sales" are two different terms, but they are both tagged with the concept of "revenue." Such fields are considered to be semantically overlapped. Fields that have different labels but are not tagged with the same concept are said to be "not semantically overlapped."

A "certain configurable range," as used herein refers to the range between the maximum and minimum distance, which may be user-selected, between the field and the target dataset in the ontology graph that the field cannot exceed and cannot be less than in order to be selected as a candidate of a predictor. In one embodiment, such a distance is based on how strongly correlated or influential is the field to the target dataset. That is, such a distance is based on the degree that the values of the target dataset depend on the value in the field. Such information may be obtained from an ontology graph derived by utilizing a machine learning model trained for determining how correlated or influential a field is to a dataset.

An example of selecting fields as candidates for predictors is discussed below in connection with FIG. 4.

Referring to FIG. 4, the field of labor hours 312 is statistically correlated with the target field of parts quantity 307 but is excluded from being selected as a potential predictor since it is so strongly correlated to the field of parts quantity 307 that it is outside the configurable range. Furthermore, the labor hours field 312 is excluded from being selected as a potential predictor since it is semantically overlapped with the field of parts quantity 307 as they are both classified as "quantity" (see concept quantity 404).

However, in another example, the field of discount 308 is statistically correlated with the target field of parts quantity 307 without exceeding the configurable range and is not semantically overlapped with the field of parts quantity 307. As a result, the field of discount 308 is selected as a candidate for a predictor.

In step 603, analytics system 100 uses each concept tagged to each candidate as the target candidate. For example, referring to FIG. 4, if the field of discount 308 is selected as a candidate for a predictor, then its tagged concept (discount 405) is selected as the target candidate. In another example, if the field of owner 318 was selected as a candidate for a predictor, then its tagged concept (customer 414) is selected as the target candidate.

In step 604, analytics system 100 discovers the concepts that have a direct or transitive influential relationship to the target concept in the ontology as discussed above in connection with step 501. For example, it may be discovered that the concept of customer 414 has a direct or transitive influential relationship to the target concept of discount 405 in the ontology.

In step 605, analytics system 100 calculates the influential confidence score for each discovered concept based on the relationship strength and the distance between the two concept nodes in the ontology graph as discussed above in connection with step 502 of FIG. 5.

In one embodiment, analytics system 100 calculates the influential confidence score for each discovered concept based on the relationship strength and the distance between the two concept nodes in the ontology graph (distance between the concept node associated with the non-target field and the concept node associated with the target concept in the ontology graph). In one embodiment, the relationship strength is based on the degree of the semantic similarity (discussed above) between the concepts in the ontology. The more semantically similar is the discovered concept to the target concept, the higher the scoring of the "influential confidence score." The "influential confidence score," as used herein, is a metric for assessing the degree of influence that the concept has in affecting the value of the target field. In one embodiment, the higher the influential confidence score, the greater the degree of influence that the concept has in affecting the value of the target field. "Influence," as used herein, refers to being able to affect the value of a field, such as the target field.

In one embodiment, the influential confidence score is not only based on the relationship strength between the concepts but also the distance between the two concept nodes in the ontology graph. In one embodiment, the distance between the concepts in the ontology graph represents the degree of influence that one concept has on the other concept and thereby the degree of influence that one concept has on the value of the field associated with the other concept. In one embodiment, the closer the distance, the greater the influential confidence score and vice-versa.

In step 606, a determination is made by analytics system 100 as to whether other datasets are included in statistical analysis.

If there are no more datasets that are included in the statistical analysis, then, in step 607, the indirect influential relationship discovery is completed.

If, however, there are more datasets included in the analytical analysis, then, in step 608, analytics system 100 selects the fields that are tagged with one of the identified concepts previously discovered as candidates for predictors, and if the field is in a logical group, then analytics system 100 selects the other fields in the same logical group as candidates for predictors. By selecting the other fields in the same logical group as candidates for predictors, sensical features are more likely to be included as potential predictors.

For example, as shown in FIG. 4, if the concept of customer 414 was previously discovered, then the field of owner 318 is selected by analytics system 100. Since the field of owner 318 is in a logical group (customer group 427), then analytics system 100 selects the other fields in the logical group (home address 319, city 320 and province 321) as candidates for predictors.

Returning to FIG. 2, in conjunction with FIGS. 1 and 3-6, in step 209, analytics system 100 evaluates numeric metadata information for each of the identified candidates (candidates for predictors). "Metadata information," as used herein, refers to data about the candidates for the predictors, such as data quality and data distribution information. For example, metadata, such as data quality and data distribution information, may be associated with the fields of the datasets.

In step 210, analytics system 100 computes a numeric analytics score for each of the identified candidates based on the evaluated metadata information. A "numeric analytics score," as used herein, refers to a value corresponding to how influential the candidate is in affecting the value of the target field, such as based on the quality of the data of the candidate and how the data is distributed to other fields, such as the target field. For example, the higher the data quality, the higher the numeric analytics score and vice-versa. In another example, the greater the data is distributed, such as to other data fields, the higher the numeric analytics score and vice-versa.

In step 211, analytics system 100 computes a "final confidence score" for each of the identified candidates using the influential confidence scores and the numeric analytics scores. In one embodiment, the final confidence score for a candidate for a predictor is an average of the influence confidence score and the numeric analytics score.

In step 212, analytics system 100 ranks the identified candidates based on the final confidence scores, such as from high to low final confidence scores.

In step 213, analytics system 100 selects a portion of the identified candidates (candidates for predictors) to build a statistical model based on the ranking, such as the top N candidates, where N may be a user-selected number.

In this manner, the present invention uses a combination of techniques to improve the performance of data retrieval and statistical analysis while also eliminating nonsensical features (predictions) which allows the analytics system to provide predictive analytics at interactive speed with meaningful predictions adapted to a specific domain.

As a result of the present invention, the analytics system can automatically and quickly select the potential predictors that have the most impact to the outcome variable (target field). The present invention does not require intensive computation to achieve feature reduction. The techniques of combining statistical analysis with domain specific semantic knowledge can quickly eliminate irrelevant features, such as features that could cause nonsensical predictions. The performance of building statistical models is dramatically improved by using heuristically reduced features without intensive computation. By eliminating the need for intensive computation, computer capabilities are improved.

Furthermore, the present invention improves the technology or technical field involving predictive analytics. As discussed above, predictive analytics encompasses a variety of statistical techniques from data mining, predictive modelling, and machine learning, that analyze current and historical facts to make predictions about future or otherwise unknown events. In business, predictive models exploit patterns found in historical and transactional data to identify risks and opportunities. Models capture relationships among many factors to allow assessment of risk or potential associated with a particular set of conditions, guiding decision-making for candidate transactions. The defining functional effect of these technical approaches is that predictive analytics provides a predictive score (probability) for each individual (customer, employee, healthcare patient, product SKU, vehicle, component, machine, or other organizational unit) in order to determine, inform, or influence organizational processes that pertain across large numbers of individuals, such as in marketing, credit risk assessment, fraud detection, manufacturing, healthcare, and government operations including law enforcement. In the realm of enterprise business analytics, users may have to analyze a vast amount of data spread across many datasets. It is a common need for the user to explore their data and select different outcome variables (targets) and identify which feature(s) have the most impact in the selected outcome variable (selected target). Many existing statistical techniques face challenges when dealing with a large number of features since building a statistical model with a large number of features can be slow or not applicable in some cases. Also, retrieving many features can be slow or expensive, especially retrieving features from pay-to-access data silos or joining many tables. Furthermore, many features limit the potential statistical and machine learning algorithms that can be employed. Additionally, using statistical analysis, it is currently only possible to establish a numerical association between the features and the outcome variable (target) and not on soft knowledge (e.g., common knowledge, common sense). As a result of such a limitation, the statistical model may generate a nonsensical prediction, such as "worldwide gross drive domestic gross." Hence, there is not currently a means for providing predictive analytics at interactive speed with meaningful predictions tailored for a specific domain (e.g., business domain).

The present invention improves such technology by classifying each field within a set of datasets with a concept defined in a domain specific ontology. After receiving a target field and identifying a target concept tagged to the target field, concepts that have an influential impact directly to the target concept or indirectly to a concept tagged to a field associated with the target field are identified. Fields are then identified as candidates for predictors from the identified concepts using a semantic relationship and a numeric association combined approach. "Candidates for predictors," as used herein, refers to fields that have been selected as being potential predictors used for building a statistical model to provide predictions tailored for a specific domain involving the target field. Influential confidence scores are then calculated for each of these identified candidates. Metadata information is then evaluated for each of the identified candidates. A numeric analytics score is then computed for each of the identified candidates based on the evaluated metadata information. After computing the numeric analytics score, a final confidence score is computed for each of the identified candidates using the influential confidence scores and the numeric analytics scores. The identified candidates are then ranked based on the final confidence scores. Based on the ranking, the top candidates are selected to build a statistical model. In this manner, predictive analytics is provided at interactive speed with meaningful predictions tailored for a specific domain (e.g., business domain). Furthermore, in this manner, there is an improvement in the technical field of predictive analytics.

The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without the use of a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for providing predictions tailored for a specific domain, the method comprising:
    identifying a target concept tagged to a target field;
    identifying concepts that have an influential impact directly to said target concept or indirectly to a concept tagged to a field associated with said target field;
    identifying fields as candidates for predictors from said identified concepts;
    calculating influential confidence scores for each of said identified candidates for predictors;
    evaluating numeric metadata information for each of said identified candidates for predictors;
    computing a numeric analytics score for each of said identified candidates for predictors based on said evaluated numeric metadata information, wherein said numeric analytics score comprises a value corresponding to how influential a candidate is in affecting a value of said target field;
    computing a final confidence score for each of said identified candidates for predictors using said influential confidence scores and said numeric analytics scores;
    ranking said identified candidates for predictors based on said final confidence scores; and
    selecting a portion of said candidates for predictors to build a statistical model based on said ranking.

2. The method as recited in claim 1 further comprising:
    calculating influential confidence scores for each of said identified concepts based on a relationship strength and a distance between a concept node associated with said identified concept and a concept node associated with said target concept in an ontology graph.

3. The method as recited in claim 1 further comprising:
    computing a measure of numeric association and a measure of significance between said target field and each other field only in a target dataset where said target field resides.

4. The method as recited in claim 3 further comprising:
    selecting fields with a measure of numeric association and a measure of significance exceeding a threshold value that do not have a semantic overlap with said target field and are within a configurable range from said target dataset as candidates for predictors.

5. The method as recited in claim 1 further comprising:
    selecting fields that are tagged with one of said identified concepts as a candidate for a predictor.

6. The method as recited in claim 5 further comprising:
    generating a set of logic groups to group fields based on their concepts and data characteristics; and
    selecting other fields in a logical group as candidates for predictors in response to a selected field being within said logical group.

7. The method as recited in claim 1, wherein said metadata comprises data quality and data distribution information.

8. A computer program product for providing predictions tailored for a specific domain, the computer program product comprising a computer readable storage medium having program code embodied therewith, the program code comprising the programming instructions for:
    identifying a target concept tagged to a target field;
    identifying concepts that have an influential impact directly to said target concept or indirectly to a concept tagged to a field associated with said target field;
    identifying fields as candidates for predictors from said identified concepts;
    calculating influential confidence scores for each of said identified candidates for predictors;
    evaluating numeric metadata information for each of said identified candidates for predictors;
    computing a numeric analytics score for each of said identified candidates for predictors based on said evaluated numeric metadata information, wherein said numeric analytics score comprises a value corresponding to how influential a candidate is in affecting a value of said target field;
    computing a final confidence score for each of said identified candidates for predictors using said influential confidence scores and said numeric analytics scores;
    ranking said identified candidates for predictors based on said final confidence scores; and
    selecting a portion of said candidates for predictors to build a statistical model based on said ranking.

9. The computer program product as recited in claim 8, wherein the program code further comprises the programming instructions for:
    calculating influential confidence scores for each of said identified concepts based on a relationship strength and a distance between a concept node associated with said identified concept and a concept node associated with said target concept in an ontology graph.

10. The computer program product as recited in claim 8, wherein the program code further comprises the programming instructions for:
    computing a measure of numeric association and a measure of significance between said target field and each other field only in a target dataset where said target field resides.

11. The computer program product as recited in claim 10, wherein the program code further comprises the programming instructions for:
   selecting fields with a measure of numeric association and a measure of significance exceeding a threshold value that do not have a semantic overlap with said target field and are within a configurable range from said target dataset as candidates for predictors.

12. The computer program product as recited in claim 8, wherein the program code further comprises the programming instructions for:
   selecting fields that are tagged with one of said identified concepts as a candidate for a predictor.

13. The computer program product as recited in claim 12, wherein the program code further comprises the programming instructions for:
   generating a set of logic groups to group fields based on their concepts and data characteristics; and
   selecting other fields in a logical group as candidates for predictors in response to a selected field being within said logical group.

14. The computer program product as recited in claim 8, wherein said metadata comprises data quality and data distribution information.

15. A system, comprising:
   a memory for storing a computer program for providing predictions tailored for a specific domain; and
   a processor connected to said memory, wherein said processor is configured to execute the program instructions of the computer program comprising:
      identifying a target concept tagged to a target field;
      identifying concepts that have an influential impact directly to said target concept or indirectly to a concept tagged to a field associated with said target field;
      identifying fields as candidates for predictors from said identified;
      calculating influential confidence scores for each of said identified candidates for predictors;
      evaluating numeric metadata information for each of said identified candidates for predictors;
      computing a numeric analytics score for each of said identified candidates for predictors based on said evaluated numeric metadata information, wherein said numeric analytics score comprises a value corresponding to how influential a candidate is in affecting a value of said target field;
      computing a final confidence score for each of said identified candidates for predictors using said influential confidence scores and said numeric analytics scores;
      ranking said identified candidates for predictors based on said final confidence scores; and
      selecting a portion of said candidates for predictors to build a statistical model based on said ranking.

16. The system as recited in claim 15, wherein the program instructions of the computer program further comprise:
   calculating influential confidence scores for each of said identified concepts based on relationship strength and distance between a concept node associated with said identified concept and a concept node associated with said target concept in an ontology graph.

17. The system as recited in claim 15, wherein the program instructions of the computer program further comprise:
   computing a measure of numeric association and a measure of significance between said target field and each other field only in a target dataset where said target field resides.

18. The system as recited in claim 17, wherein the program instructions of the computer program further comprise:
   selecting fields with a measure of numeric association and a measure of significance exceeding a threshold value that do not have a semantic overlap with said target field and are within a configurable range from said target dataset as candidates for predictors.

19. The system as recited in claim 15, wherein the program instructions of the computer program further comprise:
   selecting fields that are tagged with one of said identified concepts as a candidate for a predictor.

20. The system as recited in claim 19, wherein the program instructions of the computer program further comprise:
   generating a set of logic groups to group fields based on their concepts and data characteristics; and
   selecting other fields in a logical group as candidates for predictors in response to a selected field being within said logical group.

* * * * *